(12) United States Patent
Terashima (10) Patent No.: US 9,244,177 B2
(45) Date of Patent: Jan. 26, 2016

(54) POSITION CALCULATING METHOD AND POSITION CALCULATING DEVICE

(75) Inventor: Maho Terashima, Matsumoto (JP)

(73) Assignee: Seiko Epson, Tokyo (JP)

( * ) Notice: Subject to any disclaimer, the term of this patent is extended or adjusted under 35 U.S.C. 154(b) by 530 days.

(21) Appl. No.: 12/708,431

(22) Filed: Feb. 18, 2010

(65) Prior Publication Data

US 2010/0207810 A1    Aug. 19, 2010

(30) Foreign Application Priority Data

Feb. 18, 2009    (JP) .................................. 2009-035183

(51) Int. Cl.
| | | |
|---|---|---|
| *G01S 19/42* | (2010.01) | |
| *G01S 19/13* | (2010.01) | |
| *G01S 19/24* | (2010.01) | |
| *G01S 19/40* | (2010.01) | |

(52) U.S. Cl.
CPC ............... *G01S 19/42* (2013.01); *G01S 19/13* (2013.01); *G01S 19/24* (2013.01); *G01S 19/40* (2013.01)

(58) Field of Classification Search
CPC .............................. G01S 19/42; G01S 19/40
USPC ....................................... 342/357.25, 357.23
See application file for complete search history.

(56) References Cited

U.S. PATENT DOCUMENTS

| | | | | |
|---|---|---|---|---|
| 4,402,049 A | * | 8/1983 | Gray ............................ | 701/466 |
| 5,373,298 A | * | 12/1994 | Karouby ................. | 342/357.22 |
| 5,488,378 A | * | 1/1996 | Colley ..................... | 342/357.25 |
| 5,969,669 A | * | 10/1999 | Ishikawa et al. ........... | 342/357.2 |
| 6,191,731 B1 | * | 2/2001 | McBurney et al. ...... | 342/357.46 |
| 6,417,800 B1 | * | 7/2002 | Valio et al. ............... | 342/357.25 |
| 6,473,694 B1 | * | 10/2002 | Akopian et al. .............. | 701/478 |
| 6,762,715 B2 | * | 7/2004 | Awata et al. ............. | 342/357.25 |
| 7,064,709 B1 | * | 6/2006 | Weisenburger et al. . | 342/357.62 |
| 7,069,021 B2 | * | 6/2006 | Lehtinen ................... | 455/456.1 |
| 7,196,660 B2 | * | 3/2007 | Abraham et al. ........ | 342/357.25 |
| 2006/0116820 A1 | * | 6/2006 | Mori et al. .................... | 701/213 |

FOREIGN PATENT DOCUMENTS

| | | |
|---|---|---|
| JP | 2004-518135 A | 6/2004 |
| JP | 2006-071286 A | 3/2006 |
| JP | 2007-187455 A | 7/2007 |

(Continued)

OTHER PUBLICATIONS

May, M.; Kreisher, E.; Nasuti, T.; Sives, C., "Evaluation of GPS receiver ranging accuracy," Position Location and Navigation Symposium, 1990. Record. The 1990's—A Decade of Excellence in the Navigation Sciences. IEEE PLANS '90., IEEE , vol., no., pp. 314,321, Mar. 20-23, 1990 doi: 10.1109/PLANS.1990.66194.*

*Primary Examiner* — Gregory C Issing (74) *Attorney, Agent, or Firm* — Kilpatrick Townsend & Stockton LLP (57) ABSTRACT

Position calculating methods and devices are described. Satellite information may be calculated, which includes satellite position, satellite movement speed, and satellite movement direction of a positioning satellite. A pseudo distance between the positioning satellite and a user may be calculated based on a satellite signal received from the positioning satellite. The position of the user may be calculated using the satellite information and the pseudo distance in executing a convergence calculation with positioning information for a reference satellite, thereby eliminating a time error term from unknown quantities.

11 Claims, 7 Drawing Sheets

(56) References Cited

FOREIGN PATENT DOCUMENTS

| | | |
|---|---|---|
| JP | 2008-058146 A | 3/2008 |
| JP | 2008-175721 A | 7/2008 |
| JP | 2008-309797 A | 12/2008 |
| WO | WO 02/059634 A2 | 8/2002 |

\* cited by examiner

POSITION CALCULATING METHOD AND POSITION CALCULATING DEVICE

CROSS-REFERENCES TO RELATED APPLICATIONS

This Application claims priority under 35 U.S.C. §119 to Japanese Patent Application No. 2009-035183 filed on Feb. 18, 2009 which is hereby incorporated by reference in its entirety for all purposes.

BACKGROUND

The present invention relates to position calculating methods and devices.

A position calculating device using GPS (global positioning system) may be integrated into a mobile phone, a car navigation apparatus, or the like.

A position calculating device may calculate its own position by performing a predetermined position calculation using the position as an unknown quantity. This calculation may be based on satellite positions, satellite speeds, satellite movement directions, and pseudo distances from GPS satellites to the position calculating device. In addition, an error is included in the calculated pseudo distance due to bias of the clock provided in the position calculating device. Since it can be difficult to correct the clock bias, it is common to perform the position calculation under conditions in which the clock bias is also included as an unknown quantity.

Because such errors relate to the clock, there is not only the clock bias, but also an error (hereinafter, referred to as a "time error") included in the time that is counted. Regarding the position of a satellite required when calculating the pseudo distance, the time that is counted serves as the reference. For this reason, when the position of a satellite deviates due to a time error, the pseudo distance becomes inaccurate and this affects the accuracy of the calculated position. Japanese Patent Application No. JP-T-2004-518135 discloses a method of calculating the position under conditions in which a time error is considered.

One known way to address the issue of time error is by synchronization with a received GPS satellite signal. This may be satisfactory when the receiving intensity of a satellite signal is sufficiently strong. However, when the position calculating device is located, for example, within a building, the intensity of a received signal may be weak. Accordingly, it may be difficult in such instances to acquire the accurate time information by synchronization with a GPS satellite signal. For this reason, in some cases it may be difficult to perform accurate position calculations because accurate time cannot be acquired.

SUMMARY

In some aspects of the invention, a new position calculating method is described for calculating the position of a position calculating device without calculating a time error.

In one embodiment, a position calculating method is performed by calculating satellite information, which includes satellite position, satellite movement speed, and satellite movement direction of a positioning satellite on the basis of satellite orbit information. A pseudo distance between the positioning satellite and a user may be calculated based on a satellite signal received from the positioning satellite. The position of the user may be calculated using the satellite information and the pseudo distance in executing a convergence calculation with positioning information for a reference satellite. A time error term may be eliminated from unknown quantities by setting up simultaneous equations for the time error term for the first positioning satellite and the reference satellite and executing the simultaneous equations using the convergence calculation.

Furthermore, according to another embodiment, a position calculating device includes: a satellite information calculating module that calculates satellite information, which includes satellite position, satellite movement speed, and satellite movement direction of a positioning satellite; a pseudo distance calculating module that calculates a pseudo distance between the positioning satellite and the device based on a satellite signal received from the positioning satellite; and a position calculating module that calculates the position of the device using the satellite information and the pseudo distance in executing a convergence calculation including positioning information for a reference satellite.

According to certain aspects of the invention, the satellite information is calculated at the position calculation time on the basis of received satellite orbit information. In addition, the pseudo distance may be calculated by receiving a satellite signal from the positioning satellite. In addition, the position of the user may be calculated on the basis of the calculation expression for calculating the time error included in the position calculation time using the satellite information and the pseudo distance related to a plurality of positioning satellites.

In some embodiments, the "time error" is not a clock bias but an error included in the time itself counted by the position calculating device, and is fixed without depending on a positioning satellite. Using the time error calculating expression related to a plurality of positioning satellites on the basis of such a characteristic, it becomes possible to calculate the position of the user. In the method disclosed in Japanese Patent Application No. JP-T-2004-518135, it was calculated as an unknown quantity. On the other hand, according to certain aspects of the invention, the position of the user can be calculated without calculating the time error as an unknown quantity. Therefore, it may be possible to perform the calculation with a smaller number of unknown quantities compared with the method disclosed in Japanese Patent Application No. JP-T-2004-518135. As a result, the number of operations may be reduced in some embodiments.

Moreover, in the position calculating methods and devices described herein, the calculating of the position of the user may include eliminating the time error from unknown quantities by setting up simultaneous equations of the calculation expressions related to the plurality of positioning satellites. In this case, since the time error is eliminated from unknown quantities by setting up simultaneous equations of the calculation expressions related to the plurality of positioning satellites, it becomes possible to calculate the position of the user without calculating a time error.

Moreover, in the position calculating methods and devices described above, the calculation expression may be an expression for calculating the time error by further using a speed component of the positioning satellite in a direction from the positioning satellite to the user.

In this case, the position of the user is calculated using the time error calculating expression in which the speed component of the positioning satellite in a direction from the positioning satellite to the user is further used. Since the positioning satellite is moving, the position of the positioning satellite that the user assumes and the actual position of the positioning satellite become different if there is a time error. That is, the geometric distance which connects the position of the user with the seeming position (position of the positioning satellite calculated at the time counted by the position calculating device) of the positioning satellite and the pseudo distance which is actually observed by the user become different values. In consideration of this, the speed component of the positioning satellite in a direction from the positioning satellite to the user is considered in the time error calculating expression.

Moreover, in the position calculating method described above, the calculation expression may be an expression for calculating the time error by further using a clock bias which is an unknown quantity.

In some embodiments, the position of the user is calculated using a time error calculating expression in which the clock bias, which is an unknown quantity, is further used. Apart from the time error, an error component caused by a bias exists in the clock. For this reason, the clock bias may be considered in the time error calculating expression, as well.

BRIEF DESCRIPTION OF THE DRAWINGS

The invention will be described with reference to the accompanying drawings, wherein like numbers reference like elements.

DESCRIPTION

Hereinafter, an embodiment may be described with reference to a mobile phone (e.g., mobile phone 1 of FIG. 2). The mobile phone 1 may move by being carried by the user. For this reason the Figures may be described referring to a mobile phone or a user. However, it is worth noting that embodiments to which the invention may be applied are not limited to those described below.

1. Principles

The mobile phone 1 is an electronic apparatus which may be used when a user transmits or receives a call, a mail, or the like. The mobile phone 1 may include a position calculating device which performs the function of calculating the position of the mobile phone 1. The mobile phone 1 may calculate the position on the basis of GPS satellite signals currently transmitted from different GPS satellites. The mobile phone 1 may display a navigation screen, on which the calculated position is plotted.

The GPS satellite is a type of positioning satellite. Four or more GPS satellites are disposed on each of six orbital surfaces of the earth and are operated, in principle, such that four or more satellites can always be observed under geometric arrangement from anywhere on the earth. The GPS satellite transmits a GPS satellite signal including navigation data, such as an almanac or an ephemeris. The GPS satellite signal is a communication signal typically transmitted at a frequency of approximately 1.57542 GHz. The GPS satellite signal is modulated by the direct sequence spread spectrum method using a PRN (Pseudo Random Noise) code. The PRN code has a code length of 1023 chips, and has a repetition period of 1 ms.

Figure 1:
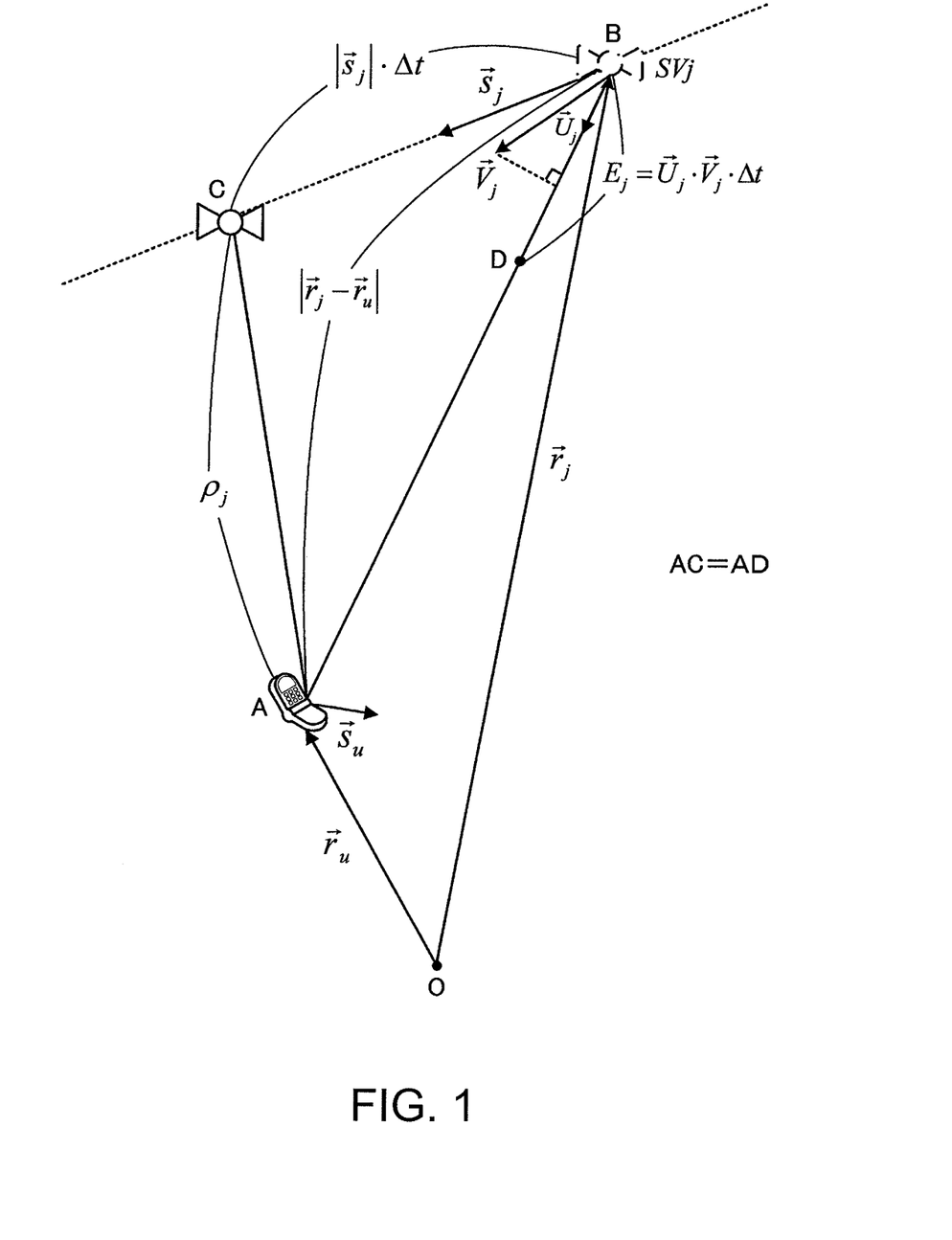
FIG. 1 is an explanatory view of the principle of position calculation according to various embodiments of the invention.

FIG. 1 is a view explaining the principle of position calculation according to some embodiments of the present invention. In the position calculating method according to one embodiment, a time error $\Delta t$ is included in a time counted by a clock mounted in the mobile phone 1. The view focused on the time error $\Delta t$ is shown in FIG. 1 to facilitate understanding of aspects of the invention, and an error component caused by a clock bias b is not shown in FIG. 1.

The terrestrial coordinate system having the earth center as the origin O is considered, and the position of the mobile phone 1 assuming that the origin O is a reference position is expressed as a three-dimensional vector $r_u$. Since the position of the mobile phone 1 is unknown, the three-dimensional position component of the vector $r_u$ is an unknown quantity. The position of the mobile phone 1 expressed as the vector $r_u$ is assumed to be A. In addition, the movement speed and movement direction of the mobile phone 1 are expressed as a movement speed vector $s_u$.

In addition, the satellite position of a j-th GPS satellite $SV_j$ at the time (hereinafter, referred to as "position calculation time") when position calculation is performed is expressed as a three-dimensional vector $r_j$. Since the three-dimensional position component of the vector $r_j$ can be calculated using the satellite orbit information, such as an ephemeris, and position calculation time, the three-dimensional position component of the vector $r_j$ is known. However, since the time error $\Delta t$ is included in the position calculation time, attention must be paid to the fact that the satellite position expressed as the vector $r_j$ is an estimated position (hereinafter, referred to as "seeming satellite position") of the GPS satellite $SV_j$ and is not necessarily a true satellite position. The seeming satellite position is assumed to be B.

The GPS satellite $SV_j$ moves along the satellite orbit expressed by a dotted line in FIG. 1. The satellite speed and satellite movement direction of the GPS satellite $SV_j$ are expressed as a satellite movement speed vector $s_j$. In this case, the true position of the GPS satellite $SV_j$ is a position C which is distant by $|s_j| \cdot \Delta t$ in the satellite movement direction from the seeming satellite position B expressed as the vector $r_j$.

The mobile phone 1 can calculate the pseudo distance between the mobile phone 1 and the GPS satellite $SV_j$ by detecting a phase of a PRN code (hereinafter, referred to as a "code phase") of a GPS satellite signal received from the GPS satellite $SV_j$. The pseudo distance that can be calculated from the code phase is called an "observed pseudo distance" in the meaning of the pseudo distance that is observed, and is expressed as $\rho_j$. In FIG. 1, $AC = \rho_j$.

The distance between the position A of the mobile phone 1 and the seeming satellite position B of the GPS satellite $SV_j$ can be expressed as $|r_j - r_u|$. That is, $AB = |r_j - r_u|$. Since the distance expressed as $|r_j - r_u|$ is a pseudo distance which is calculated and estimated on the basis of the seeming satellite position B, the distance expressed as $|r_k - r_u|$ is called an "estimated pseudo distance" in order to distinguish it from the observed pseudo distance. Since the position A of the mobile phone 1 is unknown, the value of the estimated pseudo distance is unknown.

In FIG. 1, a position D satisfying AC=AD is set on the line segment AB. In this case, the length of the line segment BD becomes an error component of the pseudo distance resulting from the time error $\Delta t$. The error component of the pseudo distance is expressed as $E_j$. That is, BD=$E_j$. In this case, in FIG. 1, the following Expression (1) is obtained from the relationship of AB−BD=AC:

$$|\vec{r}_j - \vec{r}_u| - E_j = \rho_j \tag{1}$$

The error component $E_j$ may be assumed to be a distance (distance in the line-of-sight direction) when the GPS satellite SVj has moved in a direction (opposite direction of line-of-sight direction) from the GPS satellite $SV_j$ toward the mobile phone 1 during the time error $\Delta t$. More specifically, the error component $E_j$ may be expressed as the following Expression (2) using a unit vector $U_j$ in the opposite direction of the line-of-sight direction and a relative speed vector $V_j$ between the mobile phone 1 and the GPS satellite SVj:

$$E_j = \vec{U}_j \cdot \vec{V}_j \cdot \Delta t \tag{2}$$

That is, a distance in the line-of-sight direction obtained by multiplying the inner product (component in the line-of-sight direction of relative speed) of the unit vector $U_j$ and the relative speed vector $V_j$ by the time error $\Delta t$ becomes the error component $E_j$.

Until now, the above explanation has typically been made considering an error component caused by the time error $\Delta t$ in isolation. However, when a clock bias exists, the true position of the mobile phone 1 is not a position expressed by the position vector $r_u$ shown in FIG. 1. An error caused by the clock bias is converted into a distance and is then added to the estimated pseudo distance. As a result, the following Expression (3) is obtained:

$$|\vec{r}_j - \vec{r}_u| - E_j = c \cdot b_u = \rho_j \tag{3}$$

Here, $b_u$ is a clock bias, and c is the speed of light.

By adding a correction term to Expression (3) and rearranging it, the following Expression (4) may be derived:

$$|\vec{r}_j - \vec{r}_u| - \rho_j + c \cdot b_u + q_j = E_j \tag{4}$$

Here, the correction term expressed as "$q_j$" in Expression (4) includes the sum of ionosphere delay correction, troposphere delay correction, correction of a clock error of a clock provided in a GPS satellite, correction of influence of the earth's rotation, and the like for the j-th GPS satellite. The correction term is added to the pseudo distance to calculate the pseudo distance accurately by performing the ionosphere delay correction, the troposphere delay correction, the correction of the clock error of the clock provided in the GPS satellite, the correction of the influence of the earth's rotation, and the like.

By solving the Expression (2) for $\Delta t$ and substituting the Expression (4), the following Expression (5) may be derived:

$$\Delta t = \frac{E_j}{\vec{U}_j \cdot \vec{V}_j} = \frac{|\vec{r}_j - \vec{r}_u| - \rho_j + c \cdot b_u + q_j}{\vec{U}_j \cdot \vec{V}_j} \tag{5}$$

Since the time error $\Delta t$ is an error of time of a position calculating device, the time error $\Delta t$ may be fixed without depending on a GPS satellite. That is, since the time error $\Delta t$ calculated for the j-th GPS satellite and the time error $\Delta t$ calculated for the k-th GPS satellite are substantially equal, the following Expression (6) may be obtained:

$$\frac{|\vec{r}_j - \vec{r}_u| - \rho_j + c \cdot b_u + q_j}{\vec{U}_j \cdot \vec{V}_j} = \frac{|\vec{r}_k - \vec{r}_u| - \rho_k + c \cdot b_u + q_k}{\vec{U}_k \cdot \vec{V}_k} \tag{6}$$

In the present embodiment, one reference satellite is determined out of a number of GPS satellites using such relationship. For example, the reference satellite may be the satellite with the highest signal intensity of the GPS satellite signals received. In another embodiment, the reference satellite may be the satellite with the largest angle of elevation. Alternatively, the reference satellite may simply be a satellite with a particular identification number.

In addition, simultaneous equations of the calculation expression of the time error $\Delta t$ regarding the reference satellite and the calculation expression of the time error $\Delta t$ regarding the remaining satellites are set up. Then, the position of the mobile phone 1 may be calculated by solving the simultaneous equations. In practice, the position of the mobile phone 1 may be calculated approximately by performing a convergence operation using Newton's method, for example. Thus, by eliminating the term of a time error, it becomes possible to calculate the position of the mobile phone 1 without calculating the time error.

2. Functional Configuration

Figure 2:
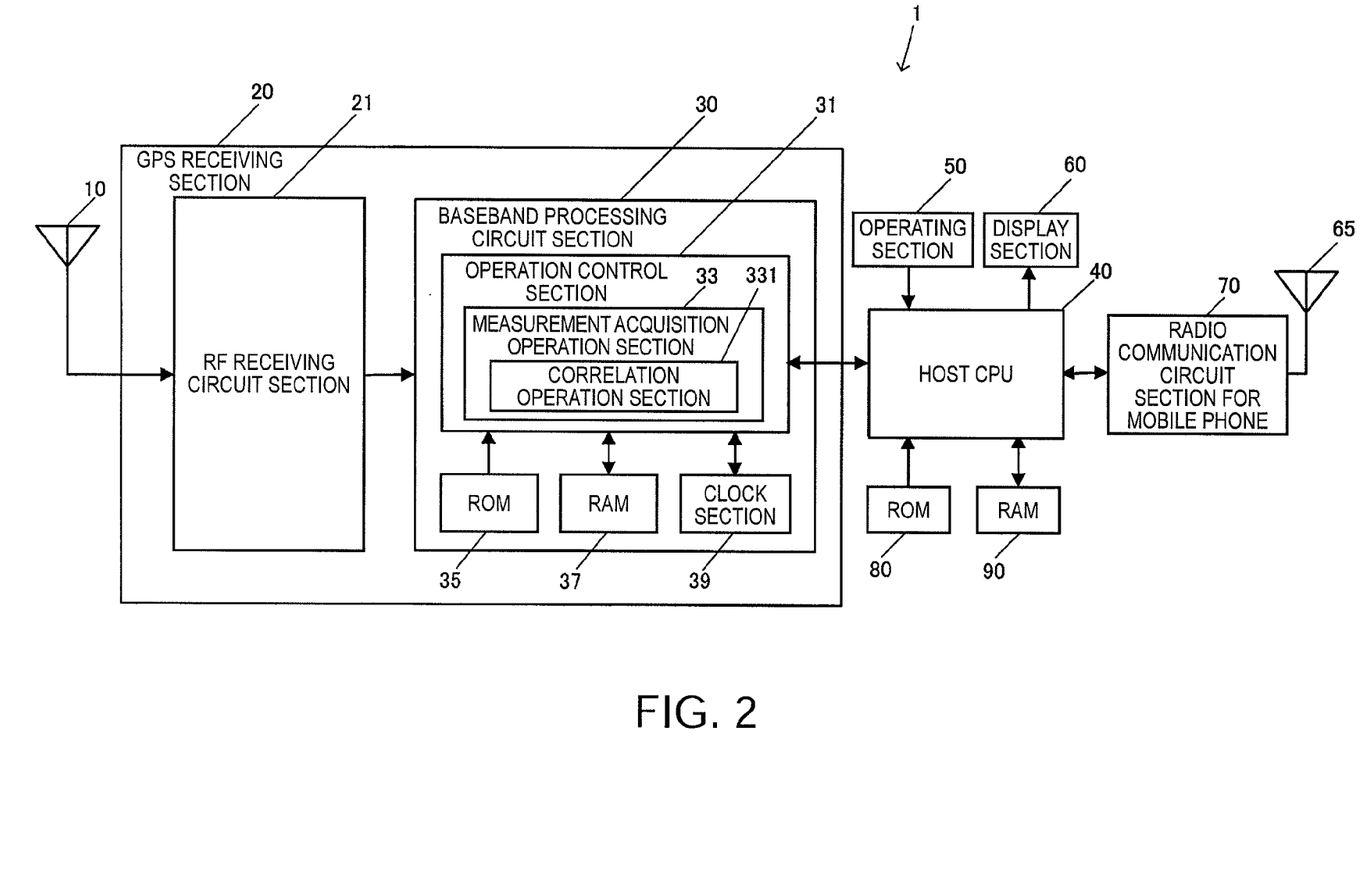
FIG. 2 is a block diagram illustrating the functional configuration of a mobile phone according to various embodiments of the invention.

FIG. 2 is a block diagram showing an example of a functional configuration of the mobile phone 1. In one embodiment, mobile phone 1 of FIG. 2 is configured to include a GPS antenna 10, a GPS receiving section 20, a host CPU (central processing unit) 40, an operating section 50, a display section 60, a mobile phone antenna 65, a radio communication circuit section 70 for a mobile phone, a ROM (read only memory) 80, and a RAM (random access memory) 90. Some or all of the functions described with reference to FIG. 2 may be performed using other processor and/or device configurations.

The GPS antenna 10 is an antenna that receives an RF (radio frequency) signal including a GPS satellite signal transmitted from a GPS satellite, and outputs the received signal to the GPS receiving section 20.

The GPS receiving section 20 may be a GPS receiver. More specifically, the GPS receiving section 20 may be a position calculation circuit which measures the position of the mobile phone 1 on the basis of a signal output from the GPS antenna 10. The GPS receiving section 20 may be configured to include an RF (radio frequency) receiving circuit section 21 and a baseband processing circuit section 30. In addition, the RF receiving circuit section 21 and the baseband processing circuit section 30 may be manufactured as separate LSIs (large scale integration), or may be manufactured as one chip.

In one embodiment, the RF receiving circuit section 21 is a circuit block for RF signal processing, and generates an oscillation signal for RF signal multiplication by dividing or multiplying a predetermined oscillation signal. Then, the RF signal is down-converted into an intermediate frequency signal (hereinafter, referred to as an "IF signal") by multiplying the RF signal output from the GPS antenna 10 by the generated oscillation signal. The IF signal may be amplified, and converted into a digital signal by an A/D converter in the RF receiving circuit section 21. The IF signal may then be output to the baseband processing circuit section 30.

In one embodiment, the baseband processing circuit section 30 is a circuit section that captures and extracts a GPS satellite signal by performing correlation processing and the like on the IF signal output from the RF receiving circuit section 21. The baseband processing circuit section 30 may acquire a navigation message, time information, and the like by decoding the data. The baseband processing circuit section 30 may be configured to include an operation control section 31, a ROM 35, a RAM 37, and a clock section 39. In addition, the operation control section 31 may be configured to include a measurement acquisition operation section 33.

In one embodiment, the measurement acquisition operation section 33 is a circuit section that captures a GPS satellite signal from the received signal (IF signal), which is output from the RF receiving circuit section 21, and may be configured to include a correlation operation section 331. The measurement acquisition operation section 33 may acquire information, such as the reception frequency or code phase of the captured GPS satellite signal, and outputs the information to the host CPU 40 as the measurement observation value.

The correlation operation section 331 may capture the GPS satellite signal by performing the correlation processing for calculating and integrating the correlation between a PRN code and a replica code included in the received signal, for example, using the FFT (fast Fourier transform) operation. The replica code is a simulated signal of a PRN code which is generated in a pseudo manner and is included in a GPS satellite signal to be captured.

If a GPS satellite signal to be captured is correct, a PRN code and a replica code included in the GPS satellite signal will match each other (capture success). If it is wrong, the PRN code and the replica code included in the GPS satellite signal will not match (capture failure). Accordingly, it may be determined whether or not capturing of a GPS satellite signal has succeeded by determining the peak of the calculated correlation value. Thus, the GPS satellite signal may be captured by performing a correlation operation with the same received signal while sequentially changing the replica code.

In addition, the correlation operation section 331 may perform the above-described correlation processing while changing the frequency and phase of the generated signal of the replica code. When the frequency of the generated signal of the replica code and the frequency of the received signal match each other and the phase of the PRN code and the phase of the replica code match each other, the correlation value is at a maximum.

More specifically, the range of predetermined frequency and phase corresponding to a GPS satellite signal to be captured may be set as a search range. Then, a correlation operation in the phase direction for detecting the starting position (code phase) of a PRN code and a correlation operation in the frequency direction for detecting the frequency may be performed within the search range. The search range related to the frequency may be set within a predetermined frequency sweep range having approximately 1.57542 GHz as a center frequency (which is a carrier frequency of the GPS satellite signal). The search range related to the phase may be set within a code phase range of 1023 chips, which is the chip length of the PRN code.

In one embodiment, the clock section 39 is a clock which counts time and outputs the counted time to the host CPU 40. The host CPU 40 may calculate the position using the counted time output from the clock section 39. In addition, the host CPU 40 may correct the clock section 39 on the basis of reference time acquired as assist information from the base station or clock bias and time error obtained by performing position calculation.

In one embodiment, the host CPU 40 is a processor which performs overall control of the sections of the mobile phone 1 according to various programs, such as a system program, stored in the ROM 80. In addition, the host CPU 40 may determine the output position displayed on the display section 60 by measuring the position of the mobile phone 1, generating a navigation screen on which the output position is plotted, and displaying the navigation screen on the display section 60.

The operating section 50 may be an input device configured to include a touch panel or a button switch, for example, and may output a signal corresponding to a pressed key or button to the host CPU 40. By the operation of the operating section 50, various kinds of instruction input may be performed, such as call request, mail transmission/reception request, or display request of the navigation screen.

The display section 60 may be a display device formed by using an LCD (liquid crystal display). The display section 60 may perform various kinds of display on the basis of a display signal input from the host CPU 40. A navigation screen, time information, and the like may be displayed on the display section 60.

The mobile phone antenna 65 is an antenna used to perform transmission and reception of a radio signal for mobile phones between the mobile phone 1 and a base station provided by a communication service provider of the mobile phone 1.

The radio communication circuit section 70 for a mobile phone is a communication circuit section of a mobile phone which may include an RF conversion circuit, a baseband processing circuit, and the like and realizes transmission and reception of a call or mail by performing modulation, demodulation, and the like of the radio signal for mobile phones.

The ROM 80 is a read-only nonvolatile storage device and stores a system program which is used when the host CPU 40 controls the mobile phone 1, various programs or data used to realize a position calculation function, and the like.

The RAM 90 is a readable and writable volatile storage device and forms the work area in which the system program executed by the host CPU 40, various processing programs, data being processed in various kinds of processing, a processing result, and the like are temporarily stored.

3. Data Configuration

Figure 3:
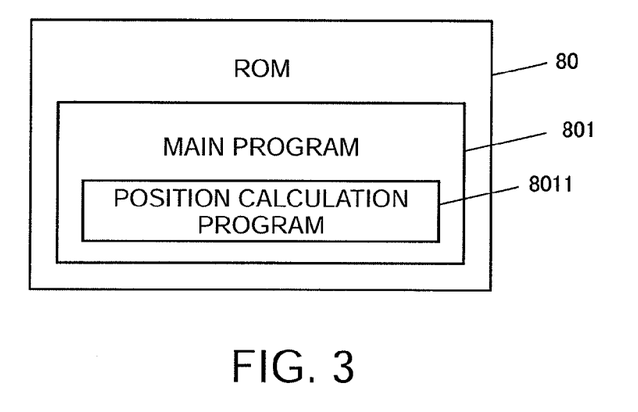
FIG. 3 is a view illustrating an example of data stored in a ROM according to various embodiments of the invention.

FIG. 3 is a view showing an example of data stored in the ROM 80. A main program 801 which is read by the host CPU 40 and is executed as main processing (refer to FIG. 7) may be stored in the ROM 80. In addition, a position calculation program 8011 executed as position calculation processing (refer to FIGS. 8 and 9) may be included as a subroutine in the main program 801.

Figure 7:
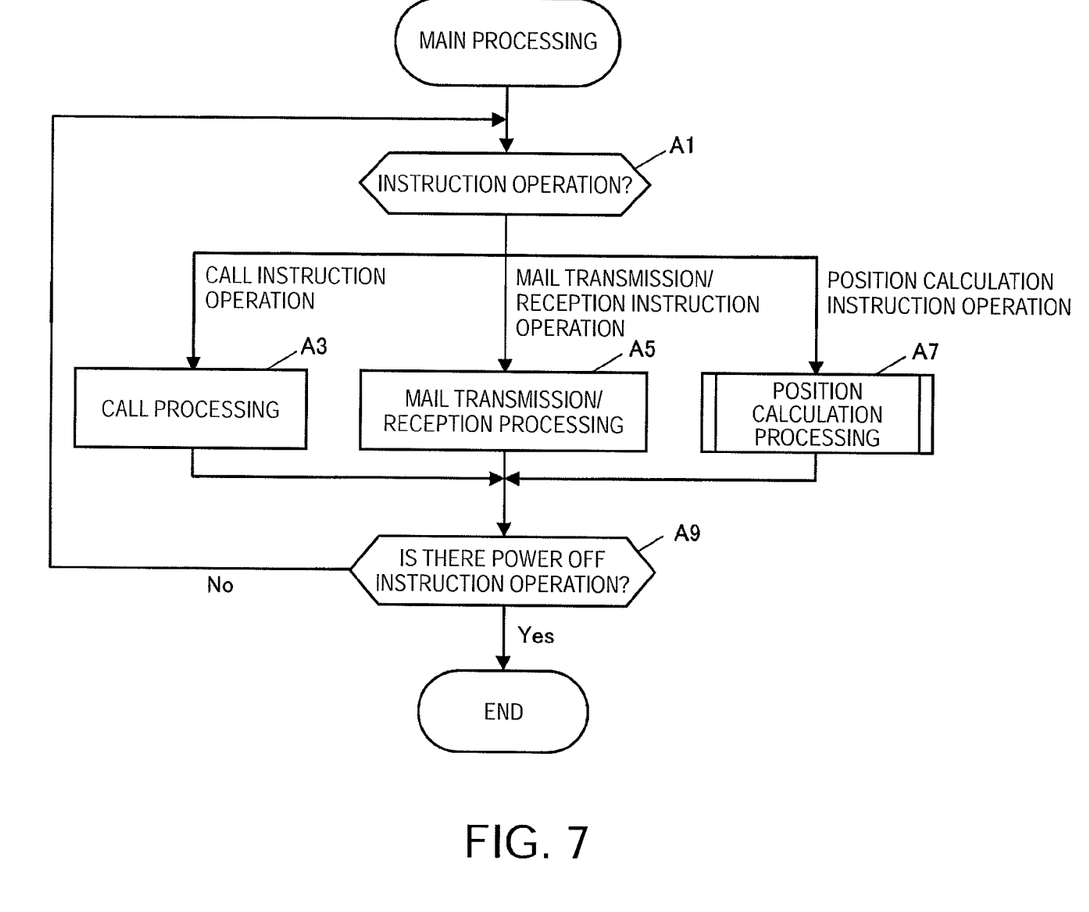
FIG. 7 is a flow chart showing the flow of main processing according to various embodiments of the invention.

In the main processing, the host CPU 40 performs not only processing for transmission and reception of a call or mail, which is an original function of the mobile phone 1, but also processing for calculating the position of the mobile phone 1. Details of the main processing will be described later using a flow chart.

Figure 8:
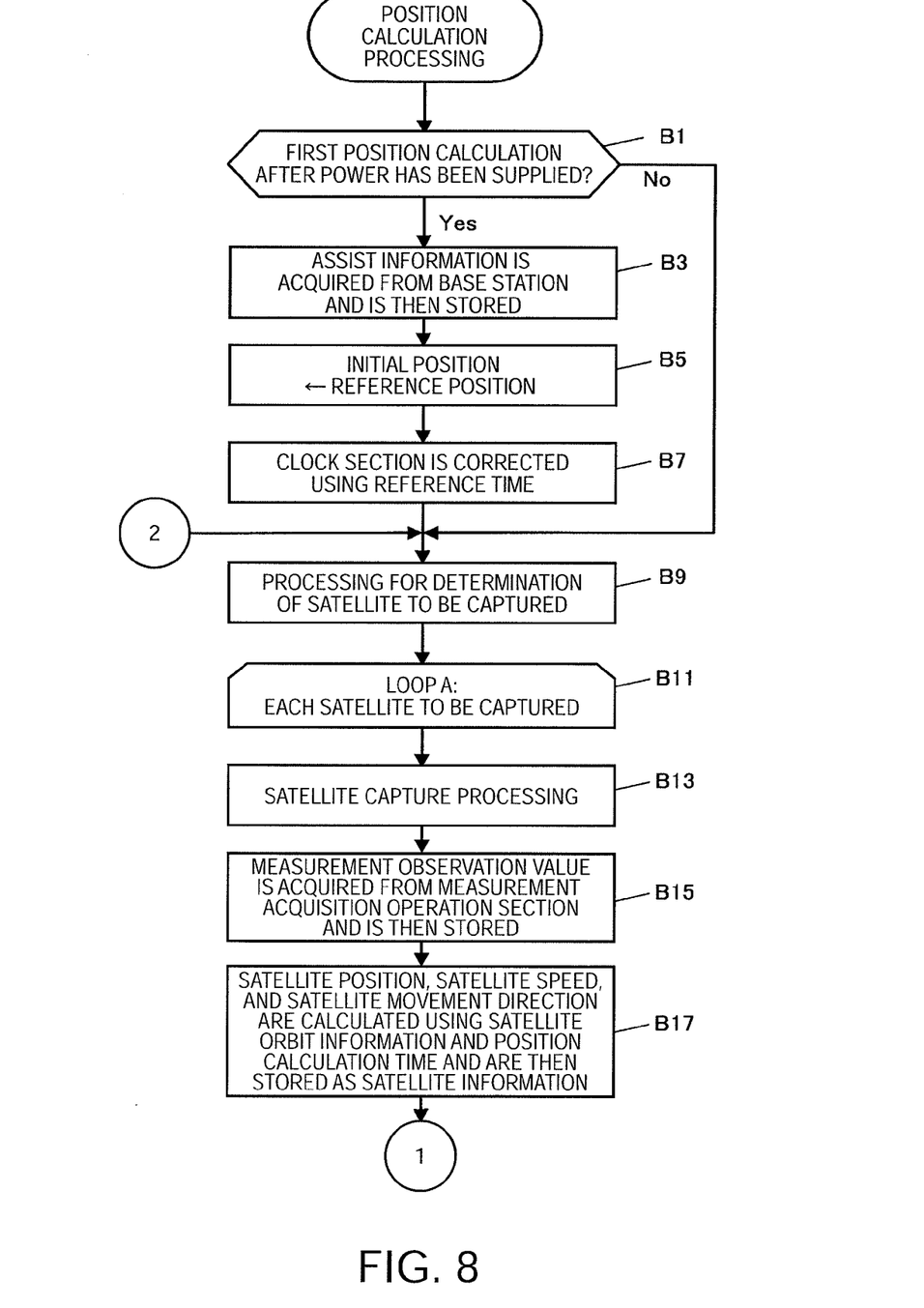
FIG. 8 is a flow chart illustrating the flow of position calculation processing according to various embodiments of the invention.
Figure 9:
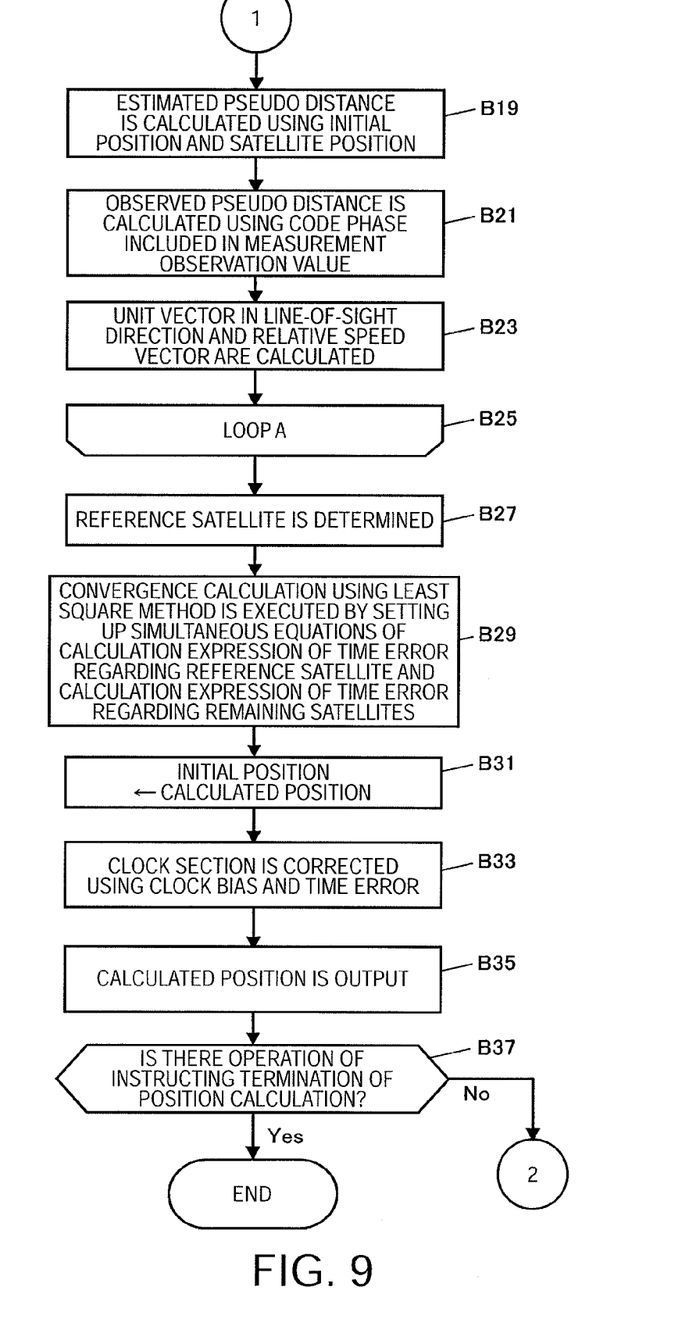
FIG. 9 is a flow chart illustrating the flow of position calculation processing.

The position calculation processing is processing when the host CPU 40 calculates the position of the mobile phone 1 by performing the position calculation processing on the basis of the above-described principle, generates a navigation screen on which the calculated position is plotted, and displays the navigation screen on the display section 60. Details of the position calculation processing will also be described later using a flow chart.

Figure 4:
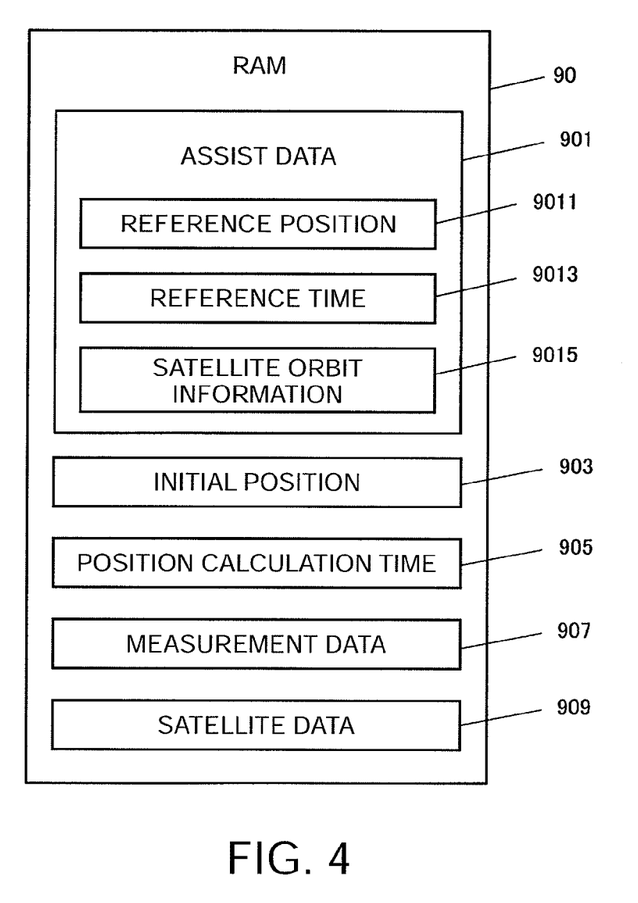
FIG. 4 is a view showing an example of the data stored in a RAM according to various embodiments of the invention.

FIG. 4 is a view showing an example of data stored in the RAM 90. Assist data 901, initial position 903, position calculation time 905, measurement data 907, and satellite data 909 may be stored in the RAM 90.

The assist data 901 is data in which assist information for position calculation acquired from the base station of the mobile phone 1 is stored in first position calculation of the mobile phone 1 after power has been supplied. Reference position 9011, reference time 9013, and satellite orbit information 9015 may be included in the assist data 901.

The reference position 9011 is a position that the mobile phone 1 refers to as the initial position in the first position calculation after power has been supplied. For example, the installation position of the base station may be set as the reference position 9011.

The reference time 9013 is time that the mobile phone 1 refers to as initial time in the first position calculation after power has been supplied. For example, time counted by the clock of the base station may be set as the reference time 9013.

The satellite orbit information 9015 is an almanac which is data regarding the approximate satellite orbits of one or more GPS satellites or an ephemeris which is data regarding the detailed satellite orbit of each GPS satellite.

The initial position 903 may be an initial position used when the host CPU 40 performs the position calculation. In the first position calculation after power has been supplied, the calculation is performed using the reference position 9011 acquired from the base station as the initial position 903. In second and subsequent position calculation, the calculation is performed using the calculation position obtained by the previous calculation as the initial position 903.

The position calculation time 905 is time used when the host CPU 40 performs the position calculation and is counted time output from the clock section 39.

Figure 5:
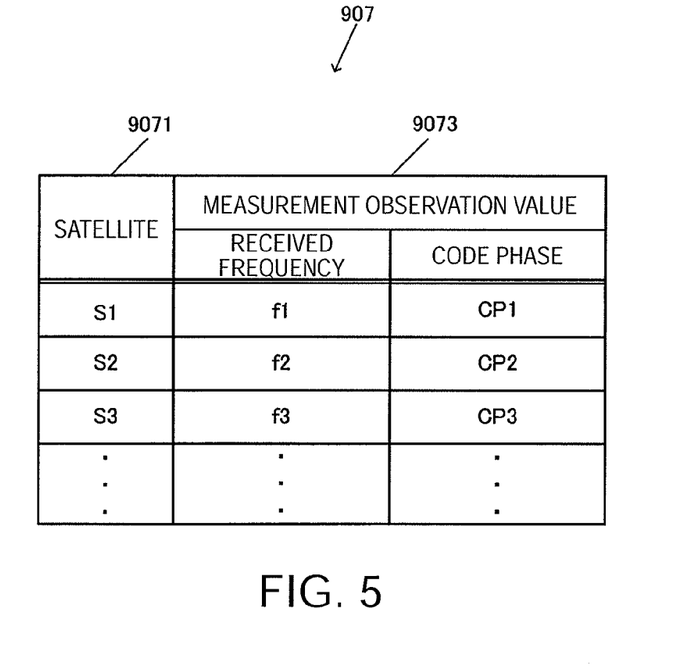
FIG. 5 is a view showing an example of the data configuration of measurement data according to various embodiments of the invention.

FIG. 5 is a view showing an example of the data configuration of the measurement data 907. In the measurement data 907, received frequency and code phase of a GPS satellite signal received from the corresponding satellite are stored as a measurement observation value 9073 so as to correspond with each other, for each satellite 9071. For example, for the measurement observation value regarding a satellite S1, the received frequency is f1 and the code phase is CP1.

Figure 6:
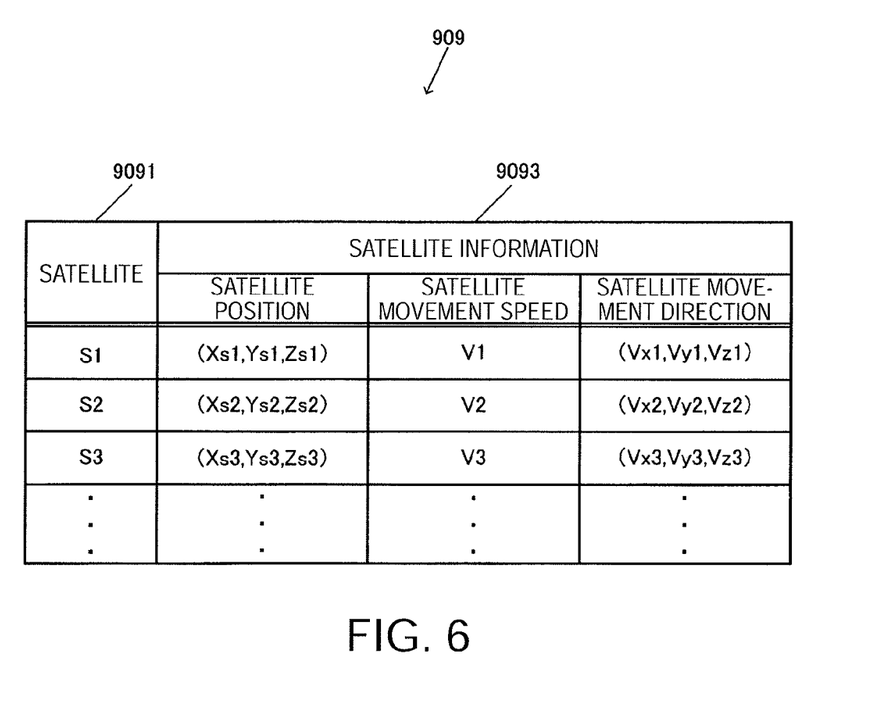
FIG. 6 is a view showing an example of the data configuration of satellite data according to various embodiments of the invention.

FIG. 6 is a view showing an example of the data configuration of the satellite data 909. In the satellite data 909, satellite position, satellite movement speed, and satellite movement direction of the corresponding satellite are stored as satellite information 9093 so as to correspond with each other, for each satellite 9091. For example, in the satellite information regarding the satellite S1, the satellite position is (Xs1, Ys1, Zs1), the satellite movement speed is V1, and the satellite movement direction is (Vx1, Vy1, Vz1).

4. Flow of Processing

FIG. 7 is a flow chart showing an example of the main processing which may be executed, for example, in the mobile phone 1. This may occur when the main program 801 stored in the ROM 80 is executed after being read by the host CPU 40.

The main processing may start when the host CPU 40 detects that the user has performed a power supply operation through the operating section 50. In addition, although not particularly described, it is assumed that an RF signal is received through the GPS antenna 10, down-converted to an IF signal by the RF receiving circuit section 21, and output to the baseband processing circuit section 30 as necessary while the following main processing is being executed. In addition, it is assumed that the received frequency and code phase of a GPS satellite signal are calculated by the measurement acquisition operation section 33 as necessary.

First, the host CPU 40 determines an instruction operation that the user has performed through the operating section 50 (step A1). When the instruction operation is determined to be a call instruction operation (step A1; call instruction operation), call processing is performed (step A3). Specifically, the host CPU 40 prompts the radio communication circuit section 70 for the mobile phone to perform base station communication with a radio base station, so that a call between the mobile phone 1 and another apparatus is realized.

In addition, when it is determined that the instruction operation in step A1 is a mail transmission/reception instruction operation (step A1; mail transmission/reception instruction operation), the host CPU 40 performs mail transmission/reception processing (step A5). Specifically, the host CPU 40 prompts the radio communication circuit section 70 for the mobile phone to perform base station communication, so that transmission and reception of a mail between the mobile phone 1 and another apparatus is realized.

In addition, when the instruction operation is determined to be a position calculation instruction operation in step A1 (step A1; position calculation instruction operation), the host CPU 40 performs the position calculation processing by reading the position calculation program 8011 from the ROM 80 and executing it (step A7).

FIGS. 8 and 9 are flow charts showing the flow of position calculation processing.

First, the host CPU 40 determines whether or not the position calculation is the first position calculation of the mobile phone 1 after power has been supplied (step B1). When the host CPU 40 determines that the position calculation is not the first position calculation (step B1; No), the process proceeds to step B9.

When the host CPU 40 determines that the position calculation is the first position calculation (step B1; Yes), the host CPU 40 acquires the reference position 9011, the reference time 9013, and the satellite orbit information 9015 from the base station as the assist information and stores them in the RAM 90 as the assist data 901 (step B3).

The host CPU 40 stores the reference position 9011 in the RAM 90 as the initial position 903 (step B5), and corrects the time of the clock section 39 provided in the baseband processing circuit section 30 using the reference time 9013 (step B7).

The host CPU 40 may then determine a satellite to be captured (step B9). Specifically, at the position calculation time 905 (e.g., a time counted by the clock section 39), the host CPU 40 makes a determination on a GPS satellite located in the sky of the initial position 903 using the satellite orbit information 9015 and sets the GPS satellite as a satellite to be captured.

The CPU 40 may then execute processing of loop A for each satellite to be captured as determined in step B9 (steps B11 to B25). In the processing of loop A, the host CPU 40 may perform satellite capture processing for the satellite to be captured. This processing may be performed with the operation control section 31 provided in the baseband processing circuit section 30 (step B13).

The host CPU 40 may then acquire the measurement observation value 9073 of the satellite to be captured (e.g., from the measurement acquisition operation section 33) and store the measurement observation value 9073 in the RAM 90 as the measurement data 907 so as to correspond with the number 9071 of the satellite to be captured (step B15).

The host CPU 40 may then calculate the satellite position, satellite speed, and satellite movement direction of the satellite to be captured using the satellite orbit information 9015 and the position calculation time 905 which are stored in the RAM 90. The host CPU 40 sets them as the satellite information 9093 and stores them in the RAM 90 as the satellite data 909 so as to correspond with the number 9091 of the satellite to be captured (step B17).

The host CPU 40 may next calculate the estimated pseudo distance between the satellite to be captured and the mobile phone 1 using the initial position 903 and the satellite position of the satellite to be captured (step B19). Then, the host CPU 40 calculates the observed pseudo distance between the satellite to be captured and the mobile phone 1 using the code phase of the measurement observation value of the satellite to be captured which is stored in the measurement data 907 (step B21).

Moreover, in the above explanation on the principle, the distance between the position A of the mobile phone 1 and the seeming satellite position B of the GPS satellite $SV_j$ was set as the estimated pseudo distance. However, since the position A of the mobile phone 1 is an unknown quantity, it is difficult to calculate the estimated pseudo distance in this condition. Accordingly, in the present embodiment, the distance between the initial position 903 and the seeming satellite position of a satellite to be captured is calculated as the estimated pseudo distance. In addition, by executing convergence calculation through simultaneous equations set up by the calculation expressions of time error using the corresponding estimated pseudo distance, the position of the mobile phone 1 which is an unknown quantity can be calculated.

The host CPU 40 may then calculate a unit vector in the line-of-sight direction from the initial position 903 toward the satellite position of the satellite to be captured and also calculates a relative speed vector between the mobile phone 1 and the satellite to be captured (step B23). Then, the host CPU 40 performs the processing for the next satellite to be captured.

After performing processing of steps B13 to B23 for all satellites to be captured, the host CPU 40 ends the processing of loop A (step B25). Then, the host CPU 40 determines one reference satellite out of the satellites to be captured (step B27).

Subsequently, by setting up simultaneous equations of the calculation expression of time error regarding the reference satellite and the calculation expression of time error regarding the remaining satellites to be captured, the host CPU 40 executes the convergence calculation using the least square method (step B29). Then, the host CPU 40 updates the initial position 903 of the RAM 90 at the calculated position acquired in the convergence calculation (step B31). Then, the host CPU 40 corrects the counted time of the clock section 39 using the clock bias and the time error acquired in the convergence calculation (step B33).

The host CPU 40 may generate a navigation screen, on which the calculated position is plotted, and displays the navigation screen on the display section 60 (step B35). Then, the host CPU 40 determines whether or not the user has instructed termination of the position calculation using the operating section 50 (step B37). When it is determined that there is no instruction (step B37; No), the process returns to step B9. In addition, when it is determined that the termination of position calculation has been instructed (step B37; Yes), the position calculation processing ends.

After returning to the main processing of FIG. 7 to perform the processing of one of the steps A3 to A7, the host CPU 40 determines whether or not the user has performed a power off instruction operation using the operating section 50 (step A9). When it is determined that the power off instruction operation has not been performed (step A9; No), the process returns to step A1. In addition, when it is determined that the power off instruction operation has been performed (step A9; Yes), the main processing ends.

5. Operations

The mobile phone 1 including the position calculating device calculates the satellite information including the satellite position, satellite movement speed, and satellite movement direction of a GPS satellite at position calculation time on the basis of the satellite orbit information. In addition, the mobile phone 1 receives a GPS satellite signal from a GPS satellite in order to calculate the pseudo distance. In addition, the position of the mobile phone 1 is calculated on the basis of a calculation expression for calculating the time error included in the position calculation time using the satellite information and the pseudo distance related to a plurality of GPS satellites. In this case, the time error is eliminated from unknown quantities by setting up simultaneous equations of the calculation expressions of the time error related to a plurality of positioning satellites.

The time error is an error included in the counted time of the mobile phone 1 and is fixed without depending on a GPS satellite. For this reason, the time error is eliminated from unknown quantities by setting up simultaneous equations of a time error calculating expression formulated for a reference GPS satellite and a time error calculating expression formulated for the remaining GPS satellites. As a result, it becomes possible to calculate the position of the mobile phone 1 without calculating the time error. Moreover, in the method of the present embodiment, the calculation may be performed with a smaller number of unknown quantities compared with that in the known method. Accordingly, the amount of operations may be reduced.

Moreover, in one embodiment, an error component of the pseudo distance resulting from clock bias of the clock section 39 of the mobile phone 1 is considered in the time error calculating expression, and an error component of the pseudo distance resulting from a speed component of a GPS satellite in a direction from the GPS satellite to the mobile phone 1 is also considered in the time error calculating expression. This makes it possible to calculate the position of the mobile phone 1 accurately taking the assumed error component into appropriate consideration.

6. Modifications 6-1. Electronic Apparatus

The invention may be applied not only to the mobile phone but also to any kind of electronic apparatus as long as the electronic apparatus includes a position calculating device. For example, the invention may also be applied similarly to a notebook computer, a PDA (personal digital assistant), a car navigation apparatus, and a portable navigation apparatus.

6-2. Satellite Position Calculating System

In the above embodiment, an explanation has been made using a GPS as an example of a satellite position calculating system. However, other satellite position calculating systems may also be used, such as a WAAS (Wide Area Augmentation System), a QZSS (Quasi Zenith Satellite System), a GLONASS (Global Navigation Satellite System), and a GALILEO.

6-3. Division of Processing

Some or all of processing that the host CPU 40 executes may be performed by the operation control section 31 of the baseband processing circuit section 30. For example, the operation control section 31 acquires the calculated position by performing the position calculation processing using the measurement observation value (received frequency and code phase) calculated by the measurement acquisition operation section 33 and outputs the calculated position to the host CPU 40. In addition, the host CPU 40 uses the output position input from the operation control section 31 for various applications.

6-4. Clock Section

In the above-described embodiment, the clock section 39 is provided in the baseband processing circuit section 30. However, the clock section may be provided independently and separately from the baseband processing circuit section 30. Alternatively, the operation control section 31 may function as the clock section by counting the time on the basis of a clock signal for circuit operation.

What is claimed is:

1. A method of calculating a position of a receiver, the receiver including a position calculating device, the method comprising:

receiving, by the position calculating device, respective satellite signals from a plurality of satellites at the receiver;

deriving, by the position calculating device, satellite information, including a satellite position and a satellite velocity corresponding to each of the plurality of satellites at an instant of time; and calculating, by the position calculating device, the position of the receiver using a set of equations, the set of equations including an equation for each satellite representing a time error of a time counted by a local clock of the position calculating device, the time error being equal for each of the satellites, wherein the equation for each satellite representing the time error is a function of at least the corresponding satellite information, a pseudo distance calculated from the corresponding satellite signal at the receiver, a relative speed vector between the receiver and each satellite, and a clock bias of the local clock.

2. The method according to claim 1, wherein each equation represents the time error by further using a movement speed of each satellite in a direction from each satellite to the receiver.

3. The method according to claim 1, wherein each equation represents the time error by further using a clock bias.

4. The method according to claim 1, wherein the calculation is executed using a least square method.

5. The method according to claim 1, further comprising: receiving satellite orbit information from each satellite.

6. The method according to claim 1, wherein the receiver is a mobile phone.

7. The method according to claim 1, wherein each satellite and the receiver each comprise global positioning system (GPS) capability.

8. A position calculating device comprising:

a satellite signal receiving module adapted to receive respective satellite signals from a plurality of satellites at the position calculating device;

a satellite information calculating module adapted to derive satellite information from each satellite in the plurality of satellites, satellite information of each respective satellite including satellite orbit information, the satellite information including satellite position data, satellite movement speed data, and satellite movement direction data of a positioning satellite at a position calculation time;

a pseudo distance calculating module that calculates for a pseudo distance for each satellite in the plurality of satellites by receiving a plurality of satellite signals related to estimated satellite position data; and a position calculating module, communicatively coupled with the satellite information calculating module and the pseudo distance calculating module, and adapted to:

calculate the position of the position calculating device using a set of equations, the set of equations including an equation for each satellite representing a time error of a time counted by a local clock of the position calculating device, the time error being the same for each of the satellites, wherein the equation for each satellite representing the time error is a function of at least the corresponding satellite information, a pseudo distance calculated from the corresponding satellite signal at the position calculating device, a relative speed vector between the position calculating device and each satellite, and a clock bias of the local clock.

9. The position calculating device of claim 8, wherein each simultaneous equation represents the time error by further using a clock bias and a movement speed of each satellite in a direction from each satellite to the position calculating device.

10. The position calculating device of claim 8, wherein the position calculating device comprises a processor.

11. The position calculating device of claim 8, wherein the position calculating device comprises a mobile phone using global positioning system (GPS) for position calculation.

* * * * *

UNITED STATES PATENT AND TRADEMARK OFFICE
CERTIFICATE OF CORRECTION

PATENT NO. : 9,244,177 B2
APPLICATION NO. : 12/708431
DATED : January 26, 2016
INVENTOR(S) : Maho Terashima It is certified that error appears in the above-identified patent and that said Letters Patent is hereby corrected as shown below:

Title page

Item (73) Please delete:

"Seiko Epson, Tokyo (JP)"

and insert

--Seiko Epson Corporation, Tokyo (JP)--

Signed and Sealed this
Twenty-sixth Day of April, 2016

Michelle K. Lee
*Director of the United States Patent and Trademark Office*